(12) United States Patent
Choi et al.

(10) Patent No.: US 12,009,114 B2
(45) Date of Patent: Jun. 11, 2024

(54) APPARATUS FOR IRRADIATING ELECTROMAGNETIC WAVE TO PLANT AND METHOD THEREOF

(71) Applicant: AweXome Ray, Inc., Anyang-si (KR)

(72) Inventors: Hong Soo Choi, Seoul (KR); Sung Hyun Bae, Seoul (KR); Se Hoon Gihm, Seongnam-si (KR)

(73) Assignee: AweXome Ray, Inc., Anyang-si (KR)

( * ) Notice: Subject to any disclaimer, the term of this patent is extended or adjusted under 35 U.S.C. 154(b) by 217 days.

(21) Appl. No.: 17/587,894

(22) Filed: Jan. 28, 2022

(65) Prior Publication Data

US 2022/0238247 A1    Jul. 28, 2022

(30) Foreign Application Priority Data

Jan. 28, 2021  (KR) .................. 10-2021-0012245

(51) Int. Cl.
  *A01G 7/04*   (2006.01)
  *G21K 5/08*   (2006.01)

(52) U.S. Cl.
  CPC .................. *G21K 5/08* (2013.01); *A01G 7/04* (2013.01)

(58) Field of Classification Search
  CPC ............ A01G 7/04; A01G 7/045; G21K 5/08
  See application file for complete search history.

(56) References Cited

U.S. PATENT DOCUMENTS

| | | | | |
|---|---|---|---|---|
| 2007/0086572 A1* | 4/2007 | Dotten | ............... | H05G 2/003 378/122 |
| 2013/0181570 A1 | 7/2013 | Iizuka et al. | | |
| 2016/0000021 A1* | 1/2016 | Sugimoto | ............... | A01G 7/045 47/66.7 |
| 2017/0111984 A1 | 4/2017 | Kim et al. | | |
| 2017/0196226 A1 | 7/2017 | Taghavi et al. | | |
| 2018/0068821 A1* | 3/2018 | Eaton | ............... | G03F 7/7005 |
| 2020/0243295 A1 | 7/2020 | Gihm et al. | | |

FOREIGN PATENT DOCUMENTS

| | | | | |
|---|---|---|---|---|
| CN | 107896981 A | * | 4/2018 | ............ A01H 1/02 |
| CN | 109055072 A | * | 12/2018 | |
| EP | 3537028 A1 | | 9/2019 | |
| JP | 2001028947 A | | 2/2001 | |
| JP | 2005328734 A | | 12/2005 | |
| JP | 2012-10583 A | | 1/2012 | |
| KR | 10-1066283 B1 | | 9/2011 | |
| KR | 10-1499579 B1 | | 3/2015 | |
| KR | 10-2015-0114366 A | | 10/2015 | |
| KR | 10-1730965 B1 | | 4/2017 | |
| KR | 10-2017-0100644 A | | 9/2017 | |
| KR | 10-1992745 B1 | | 6/2019 | |
| KR | 10-2020-0071309 A | | 6/2020 | |
| KR | 10-2330120 B1 | | 11/2021 | |

OTHER PUBLICATIONS

Jeon et al., "Experimental Study for the Irradiation Effect of High Energy X-ray on the Growth of Sprout Plants Seeds," *J. Korean Soc. Radiol.*, 11(6):539-545, Nov. 2017, 7 pages.

\* cited by examiner

*Primary Examiner* — Mark R Gaworecki

(74) *Attorney, Agent, or Firm* — Seed IP Law Group LLP

(57) ABSTRACT

An apparatus for irradiating a plant with electromagnetic waves includes a power supply, a first irradiator configured to receive electric power from the power supply and irradiate electromagnetic waves, and a controller configured to control the first irradiator to irradiate electromagnetic waves having a wavelength ranging 0.05 nm or more and 10 nm or less.

15 Claims, 9 Drawing Sheets

600

APPARATUS FOR IRRADIATING ELECTROMAGNETIC WAVE TO PLANT AND METHOD THEREOF

CROSS-REFERENCE TO RELATED APPLICATION(S)

This application claims the benefit of Korean Patent Application No. 10-2021-0012245, filed on Jan. 28, 2021, in the Korean Intellectual Property Office, the disclosure of which is incorporated herein by reference.

BACKGROUND

1. Field of the Invention

The present disclosure relates to an apparatus for irradiating a plant with electromagnetic waves and a method thereof. More specifically, the present disclosure relates to an apparatus for irradiating a plant with electromagnetic waves having a specific wavelength.

2. Description of the Related Art

Electromagnetic waves are waves generated by changes in electric fields and magnetic fields, includes gamma rays, x-rays, ultraviolet (UV) rays, visible rays, infrared rays, and radio waves, and are widely used in various fields. For example, UV rays are used for sterilization, infrared rays are used for heating and remote control. In addition, the above description, electromagnetic waves are used in various fields such as microwave ovens using microwaves, televisions (TVs) and radios using waves, and mobile phones.

In relation to methods of positively affecting plants using electromagnetic waves, a method and an apparatus for irradiating UV rays, which has a wavelength component in a UV-B range (a range having a wavelength ranging from 280 nm to 340 nm) and in which a wavelength component and a visible light component in a UV-C range (a range having a wavelength ranging from 100 nm to 280 nm) are close to zero, to plants are known in the related art (Japanese Patent Publication No. 2005-328734). According to the above apparatus, it is possible to inhibit the formation of spores or the growth of mycelia in plants, thereby reducing disease and insects such as gray mildew, powdery mildew, downy mildew, and anthracnose.

In addition, in order to reduce disease and insects of plants, a method and an apparatus for emitting UV rays, red light, blue light and yellow light, which have a wavelength range from 250 nm to 375 nm, are known (for example, Japanese Patent Publication No. 2001-28947).

On the other hand, study on irradiating plants with electromagnetic waves having wavelengths out of a UV range or a visible range is not sufficient. In particular, the x-rays have a wavelength used for x-ray photography or radiotherapy. A radiographic device, which is one of electromagnetic wave generating devices, uses x-rays, gamma rays or ionizing radiation and non-ionizing radiation, which are similar to the x-rays and the gamma rays, to photograph an internal shape of an object. However, it is not well known about a positive effect on plants when x-rays, especially low-energy x-rays, may be irradiated.

SUMMARY

An aspect provides an apparatus for irradiating a plant with electromagnetic waves having a specific wavelength and a method thereof. In this regard, a plant growth may be promoted by irradiating electromagnetic waves, which have a wavelength ranging 0.05 nm or more and 10 nm or less, to the plant.

Another aspect also provides a method and an apparatus for promoting plant growth by irradiating electromagnetic waves, which have a wavelength of soft X-rays, to a plant together with a light source for plant growth.

The technical matters to be achieved by the present example embodiments are not limited to the technical matters described above, and other technical matters may be inferred from the following example embodiments.

According to an aspect, there is provided an apparatus for irradiating a plant with electromagnetic waves, which includes a power supply, a first irradiator configured to receive electric power from the power supply and irradiate electromagnetic waves, and a controller configured to control the first irradiator to irradiate electromagnetic waves having a wavelength ranging 0.05 nm or more and 10 nm or less.

According to an example embodiment, the controller may control the power supply to control a voltage or a tube voltage and a current or a tube current which are supplied to the first irradiator.

According to an example embodiment, the apparatus for irradiating a plant with electromagnetic waves may further include a mounting part which is disposed to face the first irradiator and on which plants are placed.

According to an example embodiment, the controller may control the first irradiator to irradiate the electromagnetic wave at a first intensity to a first region of a space defined by the mounting part and control the first irradiator to irradiate the electromagnetic wave at a second intensity to a second region of the space defined by the mounting part.

According to an example embodiment, the apparatus for irradiating a plant with electromagnetic waves may further include one or more ventilation devices configured to circulate air in the space defined by the mounting part.

According to an example embodiment, the first irradiator may be installed on at least one of an upper side and a side surface of the mounting part.

According to an example embodiment, the first irradiator may include a filter configured to block a wavelength component ranging 0.05 nm or less with respect to the electromagnetic waves to be irradiated According to an example embodiment, the apparatus for irradiating a plant with electromagnetic waves may further include a second irradiator configured to receive electric power from the power supply and irradiate electromagnetic waves. The second irradiator may be controlled by the controller to irradiate electromagnetic waves having a wavelength ranging 400 nm or more and 700 nm or less.

According to an example embodiment, the controller may control the first irradiator and the second irradiator such that at least a portion of a time period in which the first irradiator irradiates the electromagnetic waves may overlap a time period in which the second irradiator irradiates the electromagnetic waves.

According to an example embodiment, at least a portion of a region in which the first irradiator irradiates the electromagnetic waves may overlap a region in which the second irradiator irradiates the electromagnetic waves.

According to an example embodiment, the first irradiator may correspond to a tube including an anode and a cathode, the anode may be connected to one side of the power supply, and the cathode may be connected to the other end of the power supply.

According to an example embodiment, the tube may further include at least one gate, and at least one of one side or other side of the controller may be connected to the at least one gate.

According to an example embodiment, the cathode may include a carbon nanotube (CNT).

According to an example embodiment, the cathode may be formed of a CNT structure including a plurality of unit yarns, each having a structure in which the CNTs may be aggregated to extend in a first direction.

According to an example embodiment, in the CNT structure, a front end of each of the unit yarns may be directed in a direction that is the same as the first direction.

According to an example embodiment, a method in which the apparatus for irradiating electromagnetic waves irradiates at least one plant with electromagnetic waves having a wavelength ranging 0.05 nm or more and 10 nm or less.

The details of other example embodiments are included in the detailed description and the accompanying drawings.

Additional aspects of example embodiments will be set forth in part in the description which follows and, in part, will be apparent from the description, or may be learned by practice of the disclosure.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
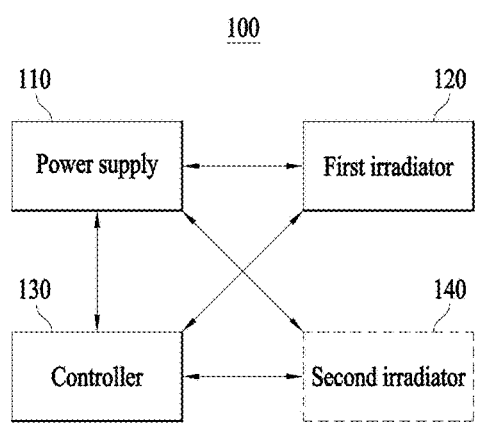
FIG. 1 is a schematic block diagram illustrating an apparatus for irradiating a plant with electromagnetic waves according to an example embodiment.

The terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it is to be noted that the terms used herein are to be construed based on practical meanings thereof and the whole content of this specification, rather than being simply construed based on names of the terms.

When a component is referred to as "being included" in a portion, this means that another component may be further included rather than not be included in the portion unless the context clearly describes otherwise. In addition, the term "~part," "module," or the like disclosed herein means a unit for processing at least one function or operation, and this unit may be implemented by hardware, software, or a combination of hardware and software.

The expression "at least one of A, B, and C" may include the following meanings: A alone; B alone; C alone; both A and B together; both A and C together; both B and C together; and all three of A, B, and C together.

The "terminal" referred to below may be implemented as a computer or a portable terminal capable of accessing a server or other terminal through a network. Here, the computer includes, for example, a laptop, a desktop, and a laptop, which are equipped with a web browser, and the portable terminal is, for example, a wireless communication device which secures portability and mobility and may include all types of handheld-based wireless communication devices including terminals based on communication, such as international mobile telecommunication (IMT), code division multiple access (CDMA), w-code division multiple access (W-CDMA), long term evolution (LTE), smartphones, and tablet personal computers (PCs).

Example embodiments of the present disclosure will be fully described in a detail below which is suitable for implementation by those skilled in the art with reference to the accompanying drawings. However, the present disclosure may be implemented in various different forms, and thus it is not limited to embodiments to be described herein.

Hereinafter, embodiments of the present disclosure will be described in detail with reference to the accompanying drawings.

In describing the example embodiments, descriptions of technical contents that are well known in the technical field to which the present disclosure pertains and are not directly related to the present disclosure will be omitted. This is to more clearly convey the gist of the present disclosure without obscuring the gist of the present disclosure by omitting unnecessary description.

For the same reason, some components are exaggerated, omitted, or schematically illustrated in the accompanying drawings. In addition, the size of each component does not fully reflect the actual size. In each drawing, the same or corresponding elements are assigned the same reference numerals.

The advantages and features of the present disclosure and the manner of achieving the advantages and features will become apparent with reference to the embodiments described in detail below with the accompanying drawings. The present disclosure may, however, be implemented in many different forms and is not to be construed as being limited to the embodiments set forth herein, and the embodiments are provided such that this disclosure will be thorough and complete and will fully convey the scope of the present disclosure to those skilled in the art, and the present disclosure is defined by merely the scope of the appended claims. The same reference numerals refer to the same components throughout this disclosure.

In this case, it will be understood that each block of flowchart diagrams and combinations of the flowchart diagrams may be performed by computer program instructions. These computer program instructions may be embodied in a processor of a general purpose computer, a special purpose computer, or other programmable data processing equipment such that the instructions performed by the processor of the computer or other programmable data processing equipment generate parts for performing functions described in flowchart block(s). These computer program instructions may use a computer or other programmable data processing equipment for implementing a function in a specific manner or may be stored in a computer readable memory, and thus the instructions which use the computer or are stored in the computer readable memory can produce a manufacturing article including instruction parts for performing the functions described in the flowchart block(s). Since the computer program instructions can also be embedded in the computer or other programmable data processing equipment, instructions, which a series of operations are performed on the computer or other programmable data processing equipment to generate a computer-executed process, thereby operating the computer or other programmable data processing equipment, can provide operations for performing the functions described in the flowchart block(s).

In addition, each block may represent a module, segment, or a portion of a code, which includes one or more executable instructions for executing specified logical function(s). It is also to be noted that, in some alternative embodiments, it is also possible for the functions mentioned in the blocks to occur out of the order. For example, two blocks shown in succession can be substantially performed simultaneously or, in sometimes, the two blocks can be performed in the reverse order according to corresponding functions.

FIG. 1 is a schematic block diagram illustrating an apparatus for irradiating a plant with electromagnetic waves according to an example embodiment.

Figure 2:
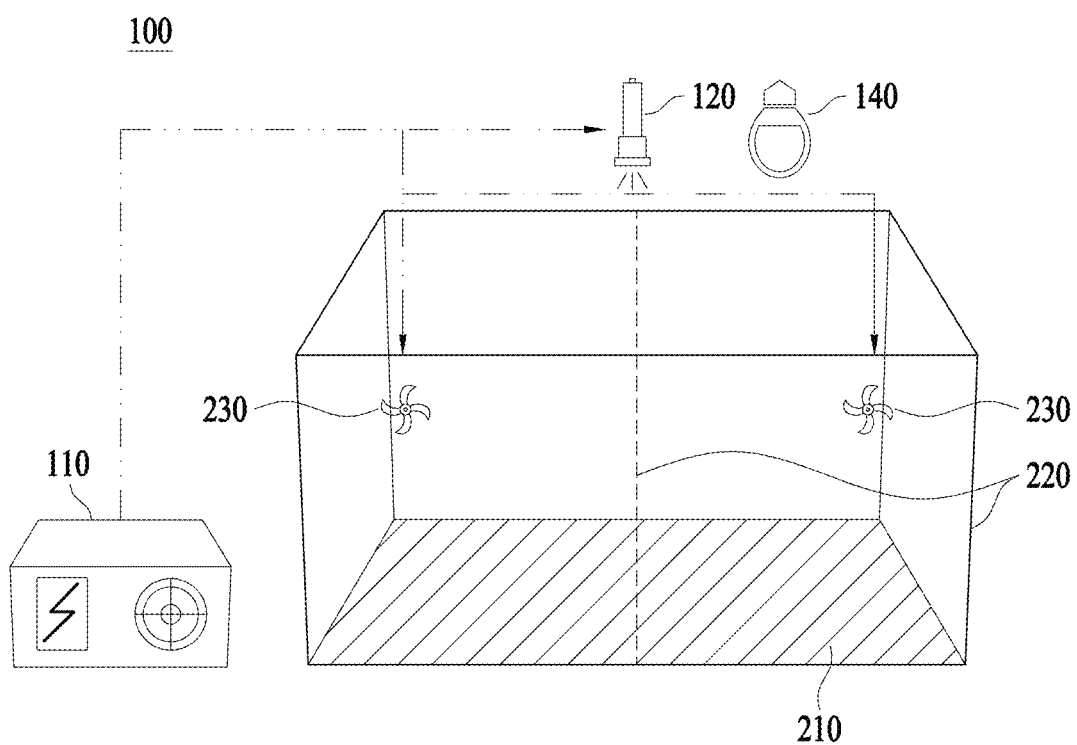
FIG. 2 is a diagram for exemplarily describing a detailed block diagram illustrating an apparatus for irradiating a plant with electromagnetic waves according to an example embodiment.

Referring to FIG. 1, an apparatus 100 for irradiating a plant with electromagnetic waves includes a power supply 110, a first irradiation part 120, and a controller 130. According to an example embodiment, the apparatus 100 for irradiating a plant with electromagnetic waves may further include a second irradiation part 140 and may further include a mounting part 210, one or more blocking parts 220, and one or more ventilation devices 230, which are shown in FIG. 2.

The controller 130 may include at least one among a transceiver, a memory, and a processor. According to an example embodiment, the power supply 110, the first irradiation part 120, or the second irradiation part 140 may include at least one among a transceiver, a memory, and a processor. The processor may perform at least one method to be described throughout the present specification, the memory may store information for performing the at least one method to be described throughout the present specification, and a code of a program executed by the processor may be stored in the memory. The memory may be a volatile memory or a non-volatile memory.

When the power supply 110, the first irradiation part 120, the controller 130, or the second irradiation part 140 includes a transceiver, the power supply 110, the first irradiation part 120, the controller 130, or the second irradiation part 140 may be connected to each other and exchange data through the transceiver. In addition, when necessary, the power supply 110, the first irradiation part 120, the controller 130, or the second irradiation part 140 may be connected to an external device and exchange data through the transceiver.

The power supply 110, the first irradiation part 120, the controller 130, and the second irradiation part 140 refer to units for processing at least one function or operation, and these may be implemented as hardware, software, or a combination thereof. Meanwhile, throughout example embodiments, the power supply 110, the first irradiation part 120, the controller 130, and the second irradiation part 140 may be implemented by separate functions in one device.

The power supply 110 supplies electric power to the first irradiation part 120. In some example embodiments, the power supply 110 may further supply electric power to at least one of the controller 130 and the second irradiation part 140. The electric power supplied by the power supply 110 may be a direct current (DC) electric power or an alternating current (AC) electric power. The power supply 110 may include a battery such as a lithium ion battery, a lithium polymer battery, or a lithium solid battery. According to an example embodiment, the power supply 110 may include at least one among a pulse width modulation (PWM) inverter, an isolating transformer, and a boost circuit (a back voltage circuit or a smoothing circuit). In this case, DC electric power generated by the battery may be converted into AC electric power by the PWM inverter. In addition, the converted AC electric power may be boosted by the insulating transformer, and a high voltage AC electric power may be output by the boosting circuit. According to an example embodiment, the power supply 110 may supply DC electric power alone.

The first irradiation part 120 is electrically connected to the power supply 110, receives electric power from the power supply 110, and irradiates electromagnetic waves. An object to which the first irradiation part 120 irradiates electromagnetic waves includes at least one plant. The first irradiation part 120 is controlled by the controller 130 to irradate electromagnetic waves having a wavelength ranging 0.05 nm or more and 10 nm or less. Electromagnetic waves having a wavelength ranging 0.05 nm or more and 10 nm or less may correspond to soft x-rays corresponding to the remaining x-rays excluding high-energy x-rays in a wavelength range ranging from 0.01 nm to less than 0.05 nm among x-rays.

Even when the first irradiation part 120 is not controlled by the controller 130, the first irradiation part 120 may be configured to irradiate merely electromagnetic waves in a wavelength range ranging 0.05 nm or more and 10 nm or less. For example, the first irradiation part 120 is an x-ray tube which generates x-rays through collision between electrons and a metal target, and among x-ray tubes, the first irradiator 120 may be a tube in which a cathode emitting an electric field is formed as a carbon nanotube (CNT) to emit x-rays (hereinafter, soft x-rays) having a wavelength ranging 0.05 nm or more and 10 nm or less. Alternatively, when the first irradiator 120 is not controlled by the controller 130, the first irradiator 120 is capable of emitting electromagnetic waves in a wavelength range ranging less than 0.05 nm or greater than 10 nm.

As described below, a time or a spatial domain range of the electromagnetic waves irradiated by the first irradiator 120 may be controlled by the controller 130.

According to an example embodiment, the first irradiator 120 may correspond to a tube which includes an anode serving as a positive electrode and a cathode serving as a negative electrode and may further selectively include a gate. The power supply 110 may be connected to at least one among the anode, the cathode, and the gate. The gate may be any one among gates of a grid structure, a wire structure, and a pin-hole structure. In addition, the gate may be formed of one or more wires and one or more hollow spaces. In the case in which the gate is present in the tube, the gate may be one gate or a multi-gate formed of several gates. The gate may induce emission of electrons, and electrons may be emitted from the cathode on the basis of a voltage applied to a tube. When the first irradiator 120 is designed according to the above structure, the anode included in the first irradiator 120 may be connected to one side of the power supply 110, the cathode included in the first irradiator 120 may be connected to other side of the power supply 110, and when necessary, at least one side of the controller 130 may be connected to the gate.

For example, in the above example embodiment, the tube may correspond to an emitter in which a cathode is formed of CNTs. In this case, a field emission device of the cathode, that is, the emitter, may include a CNT structure including a plurality of unit yarns having a structure in which a plurality of CNTs are aggregated to extend in a first direction. In this case, the CNT structure may be designed such that a front end of each unit yarn faces a direction that is the same as the first direction. In the case of the tube designed as described above, there is a merit in that most of electrons emitted through a front end of the CNT structure may be emitted in the first direction which is the direction in which each CNT and each unit yarn extend. Therefore, when the above tube is applied to an x-ray tube which generates x-rays through collision between electrons and a metal target, there is a merit in that most of the electrons may be concentrated on a desired collision portion.

However, this is merely an example constituting the first irradiator 120, and the first irradiator 120 does not necessarily include a cathode corresponding to an emitter formed of CNTs. For example, as described above, the first irradiator 120 may be capable of irradiating electromagnetic waves in a wavelength range ranging less than 0.05 nm or exceeding 10 nm. Even in this case, since the wavelength range of the electromagnetic waves irradiated from the first irradiator 120 is controlled by the controller 130, which will be described below, the implementation of the present disclosure is not limited. In addition, the first irradiator 120 according to an example embodiment may include a filter for blocking a wavelength component ranging 0.05 nm or less with respect to the electromagnetic waves to be irradiated. In this case, even when the first irradiator 120 irradiates a wavelength range ranging less than 0.05 nm, the wavelength range may be blocked by the filter.

The controller 130 may control the power supply 110 and the first irradiator 120. Specifically, the controller 130 may control the power supply 110, thereby controlling a voltage or a tube voltage and a current or a tube current which are supplied to the first irradiator 120. In addition, the controller 130 controls the first irradiator 120 to irradiate electromagnetic waves having a wavelength ranging 0.05 nm or more and 10 nm or less.

When the apparatus 100 irradiating the electromagnetic waves includes the second irradiator 140, the controller 130 may control the power supply 110, thereby controlling a voltage or a tube voltage and a current or a tube current which are supplied to the second irradiator 140. In addition, the controller 130 may control the second irradiator 140 to irradiate electromagnetic waves having a wavelength in a visible region ranging 400 nm or more and 700 nm or less.

In addition to the above description, the controller 130 may control several units included in the apparatus 100 for irradiating the electromagnetic waves. For example, when the apparatus 100 for irradiating the electromagnetic waves further includes the mounting part 210, one or more blocking parts 220, and one or more ventilation devices 230, the controller 130 may further control at least some among the mounting part 210, the one or more blocking parts 220, and the one or more ventilation devices 230.

More detailed descriptions related to the mounting part 210, the one or more blocking parts 220, and the one or more ventilation devices 230 will be described below with reference to FIG. 2.

According to an example embodiment, in relation to at least one of the first irradiator 120 and the second irradiator 140, the controller 130 may control a time for irradiating the electromagnetic waves. For example, the controller 130 may control the first irradiator 120 and the second irradiator 140 such that at least a portion of a time period in which the first irradiator 120 irradiates the electromagnetic waves overlaps a time period in which the second irradiator 140 irradiates the electromagnetic waves.

According to an example embodiment, in relation to at least one of the first irradiator 120 and the second irradiator 140, the controller 130 may control a space area for irradiating the electromagnetic waves. For example, the controller 130 may control the first irradiator 120 and the second irradiator 140 such that at least a portion of a space area in which the first irradiator 120 irradiates the electromagnetic waves overlaps a space area in which the second irradiator 140 irradiates the electromagnetic waves. According to an example embodiment, the controller 130 may control the first irradiator 120 and the second irradiator 140 such that the electromagnetic waves emitted from the first irradiator 120 are irradiate to at least some of disposed plants and the electromagnetic waves emitted from the second irradiator 140 are irradiated to at least some of the disposed plants.

According to the above example embodiments, the controller 130 may control the first irradiator 120 and the second irradiator 140 such that the electromagnetic waves irradiated from the first irradiator 120 and the electromagnetic waves irradiated from the second irradiator 140 simultaneously reach at least some of areas. In particular, when both of the electromagnetic waves irradiated from the first irradiator 120 and the electromagnetic waves irradiated from the second irradiator 140 promote plant growth, for rapid and maximized plant growth, the electromagnetic waves irradiated from the first irradiator 120 and the electromagnetic waves irradiated from the second irradiator 140 may be irradiated to all plants which are targets to be grown.

In an example embodiment, the controller 130 may adaptively control at least one of a wavelength and energy of the electromagnetic waves irradiated from the first irradiator 120. The first irradiator 120 may irradiate electromagnetic waves within a wavelength of a preset range under the control of the controller 130. In response to the plant growth cycle, the controller 130 may control at least a portion of the wavelength and energy of the electromagnetic waves irradiated from the first irradiator 120. In addition, according to an example embodiment, the controller 130 may adaptively control at least one of the wavelength and energy of the electromagnetic waves irradiated from the second irradiator 140, the second irradiator 140 may irradiate the electromagnetic waves within a wavelength of a preset range under the control of the controller 130, and in response to the plant growth cycle, the controller 130 may control at least a portion of the wavelength and energy of the electromagnetic waves irradiated from the second irradiator 140.

For example, on the basis of information related to the plant growth cycle, the controller 130 may adaptively control at least one of the wavelength and energy of the electromagnetic waves irradiated from at least one of the first irradiator 120 and the second irradiator 140. Specifically, on the basis of the information related to the plant growth cycle, the controller 130 may acquire at least one of a pattern of the wavelength of the electromagnetic waves which are to be irradiated during the plant growth cycle and a pattern of energy of the electromagnetic waves being irradiated, and according to at least one of the acquired pattern of the wavelength and the acquired pattern of the irradiation energy, the controller 130 may control at least one of the first irradiator 120 and the second irradiator 140 to irradiate electromagnetic waves. According to the plant is located at a position in the plant growth cycle, the wavelength or the irradiation energy of the electromagnetic waves capable of maximizing the growth of the plant may be different, and the pattern of the wavelength and the pattern of the irradiation energy of the electromagnetic waves to be irradiated to the plant during the plant growth cycle are acquired, and thus the electromagnetic waves are irradiated so that promotion of the plant growth may be maximized.

For example, on the basis of the information related to the plant growth cycle, in relation to at least one of the first irradiator 120 and the second irradiator 140, the controller 130 may further control at least one of the time and the space area for irradiating the electromagnetic waves.

Consequently, the controller 130 may control irradiation of the electromagnetic waves of the first irradiator 120 on the basis of a first condition related to the irradiation of electromagnetic waves of the first irradiator 120 and control irradiation of the electromagnetic waves of the second irradiator 140 on the basis of a second condition related to the irradiation of the electromagnetic waves of the second irradiator 140. The first condition and the second condition may be conditions including at least some of whether the electromagnetic waves are irradiated, an irradiation time, an irradiation area, an irradiation wavelength, and irradiation energy. The first condition and the second condition may be predetermined conditions or conditions determined by the controller 130, and at least some of the first condition and the second condition may be determined in consideration of the plant growth cycle.

As described above, the controller 130 may include at least some among a transceiver, a memory, and a processor. According to an example embodiment, the processor included in the controller 130 may correspond to a microprocessor.

The second irradiator 140 may be electrically connected to the power supply 110, may receive electric power from the power supply 110, and may irradiate the electromagnetic waves. Alternatively, in some example embodiments, the second irradiator 140 may be not electrically connected to the power supply 110 and may receive electric power from a separate power supply. However, for convenience of description, an example embodiment in which the second irradiator 140 is electrically connected to the power supply 110 will be assumed and described below.

An object to which the second irradiator 140 irradiates electromagnetic waves may include at least one plant.

The second irradiator 140 may be controlled by the controller 130 to irradiate electromagnetic waves having a wavelength ranging 400 nm or more and 700 nm or less. For example, when the second irradiator 140 is also capable of irradiating electromagnetic waves in a wavelength range ranging less than 400 nm or exceeding 700 nm, the second irradiator 140 may be controlled by the controller 130. In addition, for example, when the second irradiator 140 corresponds to a light-emitting diode (LED) capable of irradiating electromagnetic waves in a wavelength range ranging less than 400 nm or exceeding 700 nm according to an intensity of a current flowing in the second irradiator 140 or a magnitude of a voltage applied to the second irradiator 140, the controller 130 may appropriately control the intensity of the current flowing in the second irradiator 140 or the magnitude of the voltage applied to the second irradiator 140, thereby allowing the second irradiator 140 to irradiate electromagnetic waves having a wavelength ranging 400 nm or more and 700 nm or less.

Alternatively, even when the second irradiator 140 is not controlled by the controller 130, and when merely electromagnetic waves in the wavelength range ranging from 400 nm to 700 nm may be emitted, the wavelength range may not be separately controlled by the controller 130. For example, when the second irradiator 140 corresponds to monochromatic illumination emitting light alone in a visible ray range, the wavelength range may not be controlled by the controller 130.

As described above, a time or a spatial domain range of the electromagnetic waves irradiated by the second irradiator 140 may be controlled by the controller 130.

On the other hand, in an example embodiment, a great deal of plants may be cultivated in a limited space by arranging irradiation apparatuses vertically and horizontally.

FIG. 2 is a diagram for exemplarily describing a detailed block diagram illustrating an apparatus for irradiating electromagnetic waves to a plant according to an example embodiment.

Referring to FIG. 2, the apparatus 100 for irradiating a plant with electromagnetic waves according to an example embodiment may include a mounting part 210 and one or more blocking parts 220. The mounting part 210 may correspond to a structural body in the form of a pedestal. The mounting part 210 may correspond to a specific location on which a plant is placed and may be disposed to face the first irradiator 120. However, the opposing mounting part 210 and first irradiator 120 are to be taken as implying that the electromagnetic waves irradiated from the first irradiator 120 may reach the mounting part 210, and a direction in which the electromagnetic waves irradiated from the first irradiator 120 face is not to be taken as implying that the direction is to be perpendicular to a surface of the mounting part 210. For example, the first irradiator 120 may be installed on at least one of an upper side and a side surface of the mounting part 210.

A space defined by the mounting part 210 may include a first region in which more than a preset value of energy irradiated by the first irradiator 120 reaches and a second region in which less than a preset value of the energy irradiated by the first irradiator 120 reaches. In this case, in some example embodiments, more than a preset value of the energy irradiated by the second irradiator 140 may reach the second region, and less than a preset value of the energy irradiated by the second irradiator 140 may reach the first region.

The controller 130 may control the first irradiator 120 to irradiate electromagnetic waves at a first intensity to one area of the space defined by the mounting part 210 and to irradiate electromagnetic waves at a second intensity to the other area of the space defined by mounting part 210. According to an example embodiments, the controller 130 may control the second irradiator 140 to irradiate electromagnetic waves at a third intensity to one area of the space defined by the mounting part 210 and to irradiate electromagnetic waves at a fourth intensity to the other area of the space defined by mounting part 210. In some example embodiments, the area in which the second irradiator 140 irradiates the electromagnetic waves at the third intensity may correspond to the area in which the first irradiator 120 irradiates the electromagnetic waves at the first intensity, and the area in which the second irradiator 140 irradiates the electromagnetic waves at the fourth intensity may correspond to the area in which the first irradiator 120 irradiates the electromagnetic waves at the second intensity.

In some example embodiments, the area in which the electromagnetic waves at the first intensity irradiated from the first irradiator 120 may correspond to the first region, and the area in which the electromagnetic waves at the second intensity irradiated from the first irradiator 120 may correspond to the second region. Hereinafter, for convenience of description, an example in which the area in which the electromagnetic waves at the first intensity irradiated from the first irradiator 120 corresponds to the first region, and the area in which the electromagnetic waves at the second intensity irradiated from the first irradiator 120 corresponds to the second region will be merely described. However, the area in which the electromagnetic waves at the first intensity irradiated from the first irradiator 120 does not necessarily correspond to the first region, and the area in which the electromagnetic waves at the second intensity irradiated from the first irradiator 120 does not necessarily correspond to the second region.

More detailed examples related to the first region and the second region will be described below with reference to FIG. 3.

Referring to FIG. 2 again, the one or more blocking parts 220 may be a unit for sealing the space defined by the mounting part 210 or for blocking at least a portion of the space defined by the mounting part 210 from the outside. Since the one or more blocking parts 220 are installed, the extent to which the space defined by the mounting part 210 is affected by an external environment may be reduced. Thus, since the one or more blocking parts 220 are installed, an effect in that the plant placed on the mounting part 210 is subjected to electromagnetic waves may be effectively observed.

The one or more blocking parts 220 may include a material for blocking a physical influence of an external environment. For example, the one or more blocking parts 220 may include one or more glass membranes. Alternatively, the one or more blocking parts 220 may include a material which further blocks at least one of light and a temperature. For example, the one or more blocking parts 220 may include one or more glass membranes coated with a tinting film. Alternatively, the one or more blocking parts 220 may include one or more glass membranes surrounded by blackout curtains.

In addition, the one or more blocking parts 220 may include various materials which block a physical influence of an external environment and further block at least one of light and a temperature in some cases.

According to an example embodiment, the space defined by the mounting part 210 may be separated by the one or more blocking parts 220. For example, due to a blocking structure included in the one or more blocking parts 220, the space defined by the mounting part 210 may be divided into two spaces. Since the space defined by the mounting part 210 is divided by the one or more blocking parts 220, different environments may be created according to the separated spaces. Accordingly, since the space defined by the mounting part 210 is divided by the one or more blocking parts 220, different environments may be created for plants placed on the mounting part 210. It is possible to provide a distinct environment in which the electromagnetic waves are irradiated such that electromagnetic waves of different wavelengths are irradiated to both separated spaces, the electromagnetic waves having different intensities are irradiated both of the separated spaces, or the electromagnetic waves are irradiated to merely one space.

In some example embodiments, the first region and the second region may be separated by the blocking part 220. Hereinafter, for convenience of description, an example embodiment in which the first region and the second region are separated by the blocking part 220 will be described.

The apparatus 100 for irradiating electromagnetic waves to a plant may further include the one or more ventilation devices 230. The one or more ventilation devices 230 may be devices for circulating air. The one or more ventilation devices 230 may include various types of devices such as ventilation hoods or ventilation fans.

The one or more ventilation devices 230 may be electrically connected to the power supply 110 and may receive electric power from the power supply 110 to circulate air. Operations of the one or more ventilation devices 230 may be controlled by the controller 130.

Figure 3:
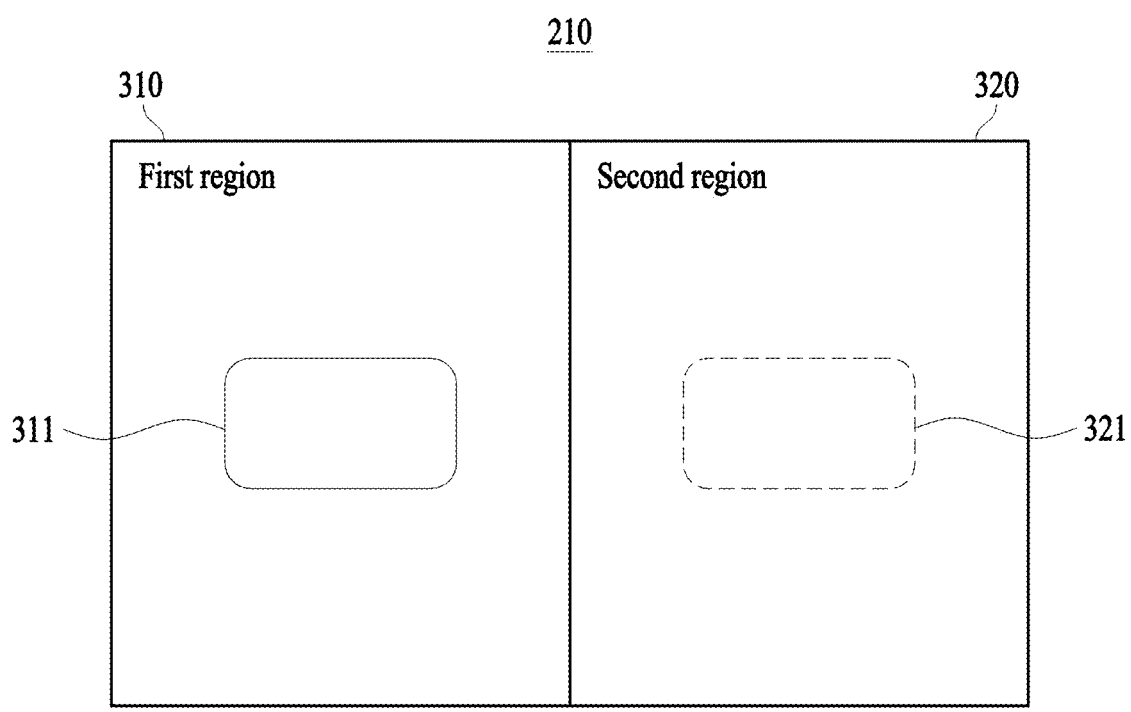
FIG. 3 is a diagram for exemplarily describing a method of irradiating electromagnetic waves in an apparatus for irradiating a plant with electromagnetic waves according to an example embodiment.

FIG. 3 is a diagram for exemplarily describing a method of irradiating electromagnetic waves in an apparatus for irradiating electromagnetic waves to a plant according to an example embodiment.

Referring to FIG. 3, the space defined by the mounting part 210 may include a first region 310 and a second region 320. The first region 310 corresponds to the first region of FIG. 2, and the second region 320 corresponds to the second region of FIG. 2. As described above, energy of the electromagnetic waves that is greater than a preset value of total energy of the electromagnetic waves emitted from the first irradiator 120 may reach the first region 310, and energy of the electromagnetic waves that is less than the preset value of the total energies of the electromagnetic waves emitted from the first irradiator 120 may reach the second region 320.

Meanwhile, in an example embodiment, the mounting part 210 may be set on the basis of a region in which electromagnetic waves irradiated from at least one of the first irradiator 120 and the second irradiator 140 reaches and may include a guide indicator capable of placing a plant. The guide indicator may arrange plants such that electromagnetic waves of required energy may be irradiated to the plants on the basis of the area in which the electromagnetic waves irradiated from the first irradiator 120 and the second irradiator 140 reach and an intensity in the area.

An example of the guide indicator will be described below with reference to FIG. 5.

In some example embodiments, the electromagnetic waves reaching the first region 310 may be intensively irradiated in a first sub-region 311 included in the first region 310, and the electromagnetic waves reaching the second region 320 may be intensively irradiated in a second sub-region 321 included in the second region 320. When the energy irradiated from the first irradiator 120 does not completely reach the second region 320, the energy may not substantially reach even the second sub-region 321.

The first region 310 and the second region 320 may be separated by the one or more blocking parts 220. On the other hand, the first sub-region 311 and the second sub-region 321 are physically separated from the remaining of the first region 310 and the second region 320 and are not independently blocked regions. However, these sub-regions may be the defined spaces in which the electromagnetic waves are intensively irradiated so as to effectively confirm effects of electromagnetic waves on the plants.

Figure 4:
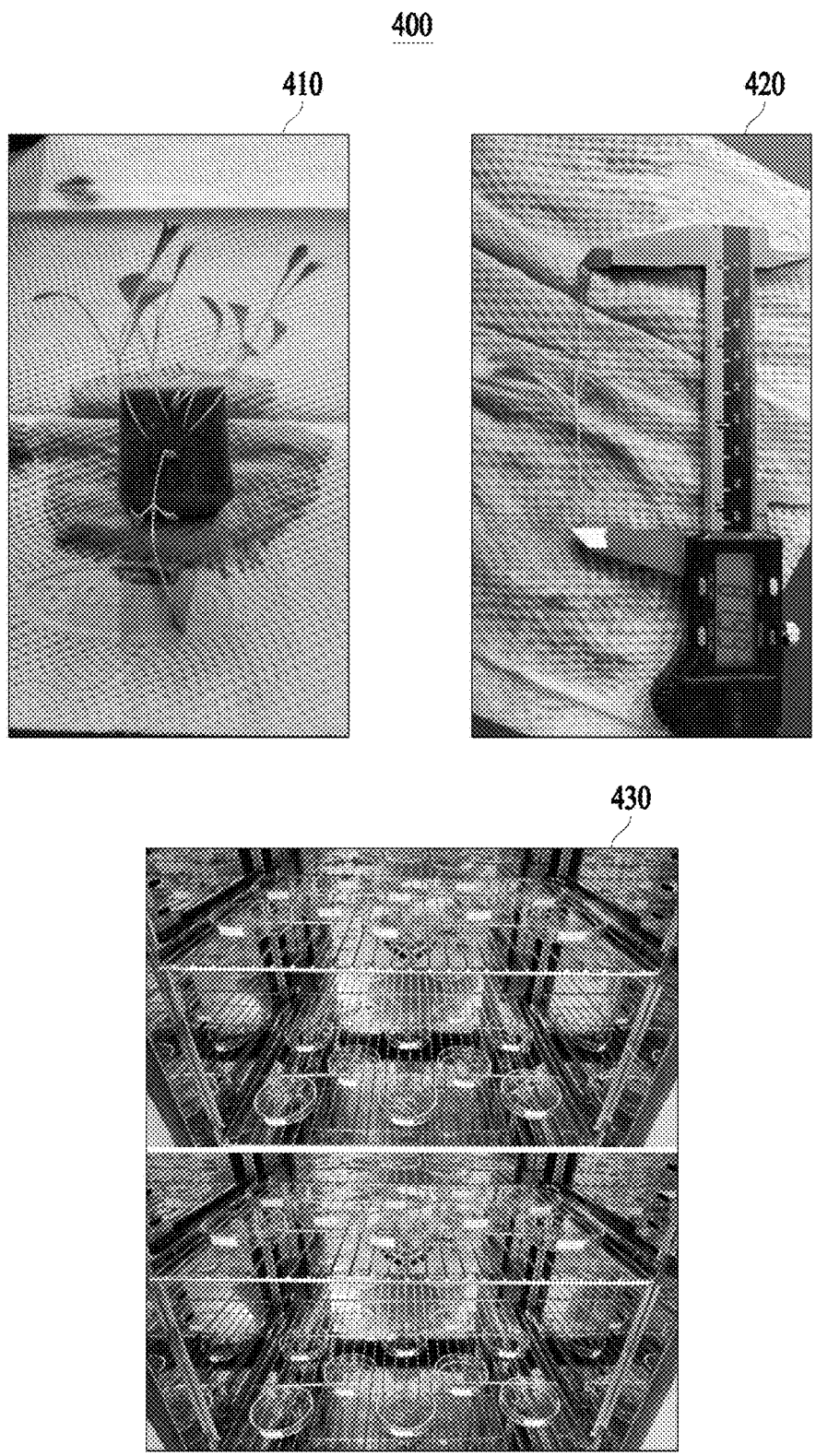
FIG. 4 shows diagrams for describing a method of measuring a degree of plant growth according to an example embodiment.

FIG. 4 shows diagrams for describing a method of measuring a degree of plant growth according to an example embodiment.

Referring to FIG. 4, various indicators may be used to measure a degree of plant growth according to an example embodiment.

According to an example embodiment, the degree of plant growth may be measured by measuring at least one of the number of germinated stems and the number of leaves. For example, a plant shown as 410 may correspond to a plant having six germinated stems and seventeen leaves. As the number of germinated stems and leaves are large, it may be determined that the degree of plant growth is high.

According to an example embodiment, a length of the longest stem is measured, and thus the degree of plant growth may be measured. For example, 420 may correspond to a case in which a result of measuring the length of the longest stem of the plant is eighty-two mm. As the length of the longest stem is long, it may be determined that the degree of plant growth is high.

According to an example embodiment, a weight of the plant is measured, and thus the degree of plant growth may be measured. Since a deviation in weight measurement may be large according to how much water a plant holds, when a weight of a plant holding water is measured, the weight of the plant may be difficult to objectively reflect the degree of the plant growth. Therefore, in order to increase correlation between the measured weight and the degree of plant growth, a dry weight from which moisture is removed may be measured. For example, 430 may correspond to an example embodiment in which a plant is placed in an oven and heated at a temperature of 70° C. for forty-eight hours to measure a weight. As a dry weight is high, the more, it may be determined that the degree of plant growth is high.

Figure 5:
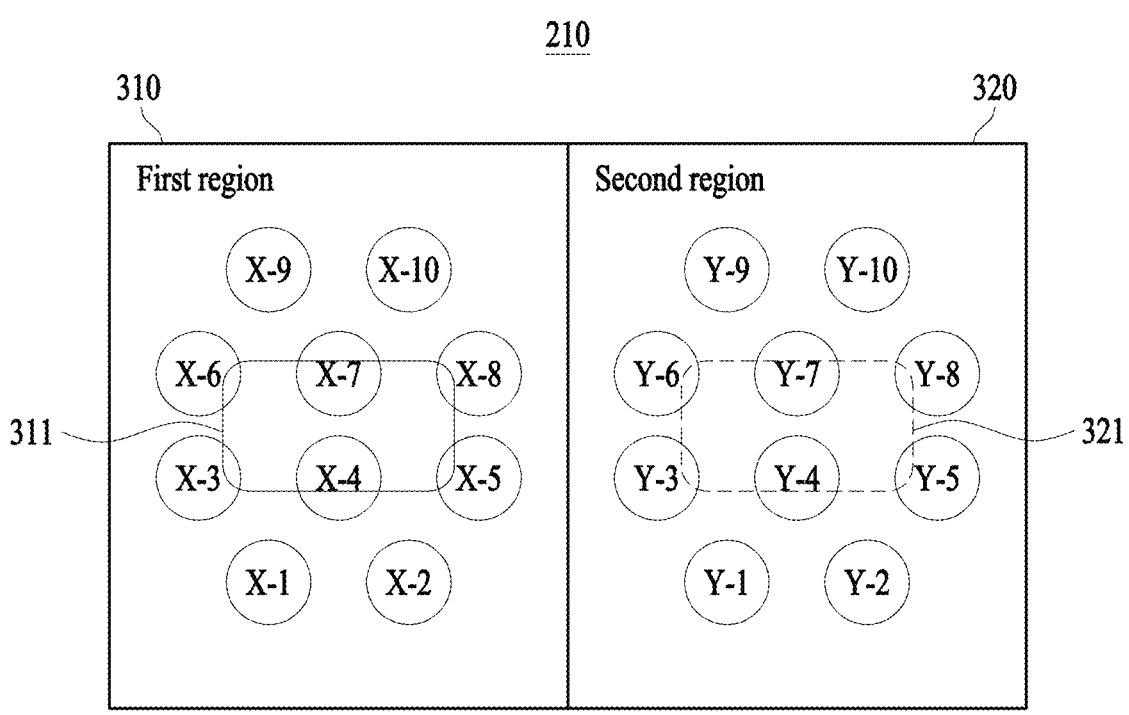
FIG. 5 is a diagram for exemplarily describing a method of arranging plants in an apparatus for irradiating a plant with electromagnetic waves according to an example embodiment.

FIG. 5 is a diagram for exemplarily describing a method of arranging plants in an apparatus for irradiating a plant with electromagnetic waves according to an example embodiment.

Referring to FIG. 5, the mounting part 210 according to an example embodiment may include guide indicators capable of arranging plants. The guide indicators may be arranged in the form of corresponding to each other in the first region 310 and the second region 320. On the basis of the above description, a plurality of plants may be arranged in the form of corresponding to each other in the first region 310 and the second region 320. For example, the plants may be disposed on guide indicators X-1 to X-10 of the first region 310 and may be disposed on guide indicators Y-1 to Y-10 of the second region 320, and in relation to natural numbers of one or more and tenor less, a position of X-N in the first region 310 may correspond to a position of Y-N in the second region 320. By arranging the plants at the corresponding positions, it is possible to derive experimental results that maximally exclude a difference in the degree of plant growth caused by external factors excluding the electromagnetic waves irradiated from the first irradiator 120 and the second irradiator 140. In addition, the energy of the electromagnetic waves reaching the first region 310 or the energy of the electromagnetic waves reaching the second region 320 may not be uniform (for example, the electromagnetic waves are intensively irradiated to the first sub-region 311 and second sub-region 321). By arranging the plants at positions corresponding thereto, it is also possible to derive experimental results on a difference in the degree of plant growth according to reaching energy of the electromagnetic waves.

Hereinafter, in FIGS. 6 to 8, in order to clearly observe an effect of the electromagnetic waves having a wavelength ranging 0.05 nm or more and 10 nm or less irradiated from the first irradiator 120 on the plant growth, the experiment was performed in an environment in which the electromagnetic waves having a wavelength ranging 0.05 nm or more and 10 nm or less irradiated from the first irradiator 120 was irradiated merely to the first region 310, and the electromagnetic wave having a wavelength ranging 400 nm or more and 700 nm or less irradiated from the second irradiator 140 was irradiated merely to the second region 320. In addition, in FIGS. 6 to 8, the plants were arranged according to a form exemplified in FIG. 5, the experiment was performed in an environment in which the electromagnetic waves reaching the first region 310 was intensively irradiated to the first sub-region 311 included in the first region 310, and the electromagnetic waves reaching the second region 320 was intensively irradiated to the second sub-region 321 included in the second region 320.

Figure 6:
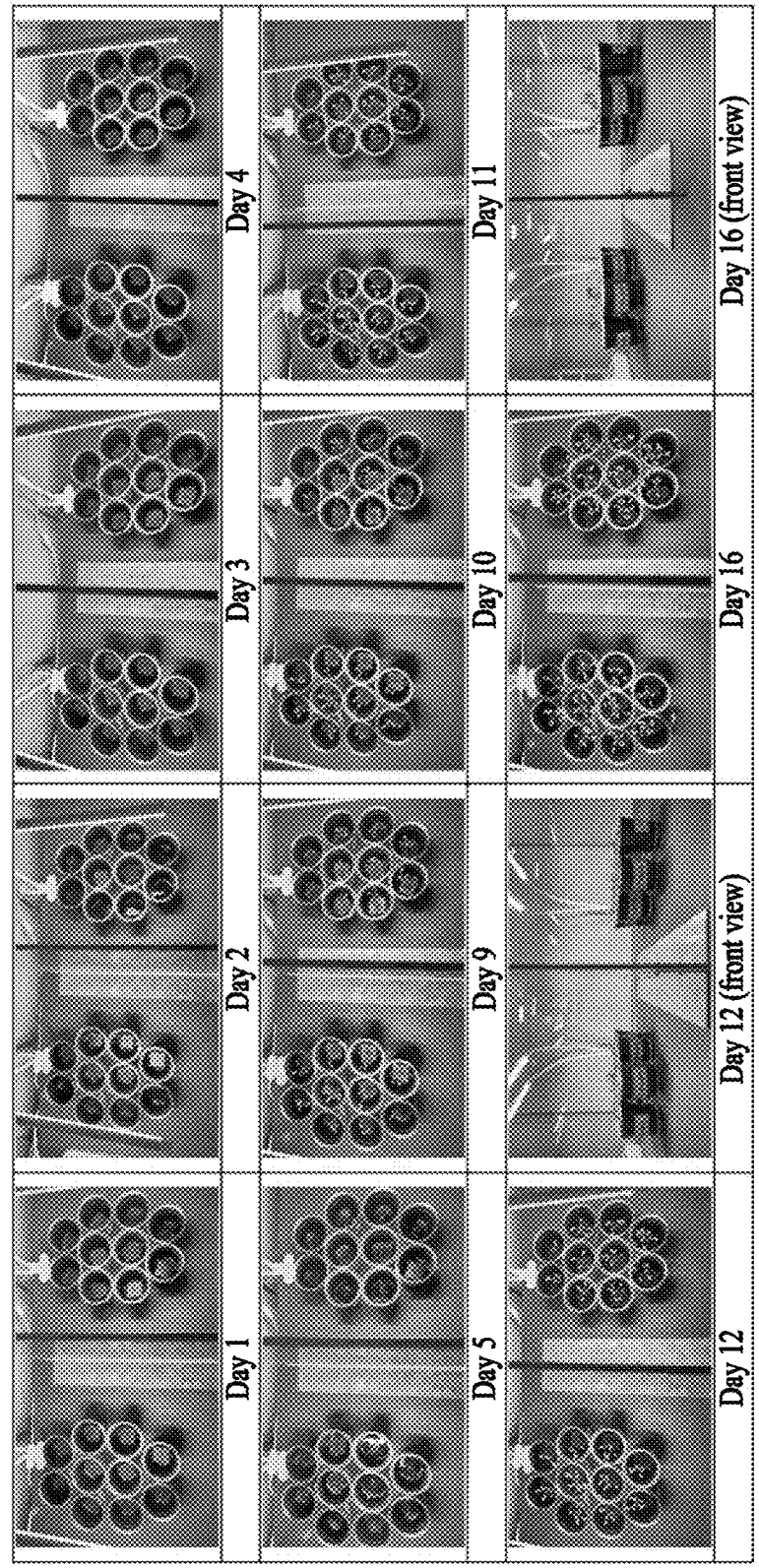
FIG. 6 shows photographs in which a degree of plant growth due to irradiation of electromagnetic waves is photographed over time in an apparatus for irradiating a plant with electromagnetic waves according to an example embodiment.
Figure 7:
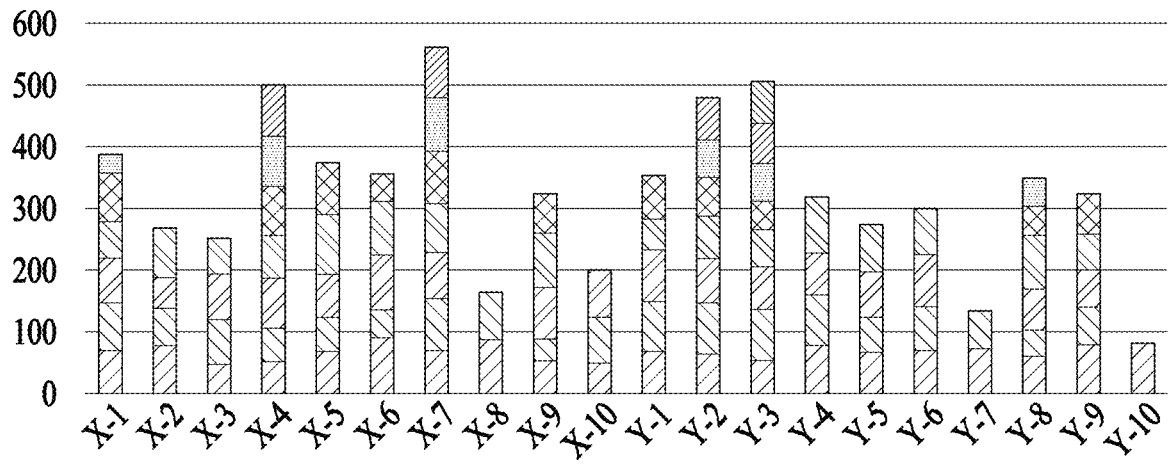
FIG. 7 shows graphs in which a degree of plant growth due to irradiation of electromagnetic waves is illustrated in an apparatus for irradiating a plant with electromagnetic waves according to an example embodiment.
Figure 7:
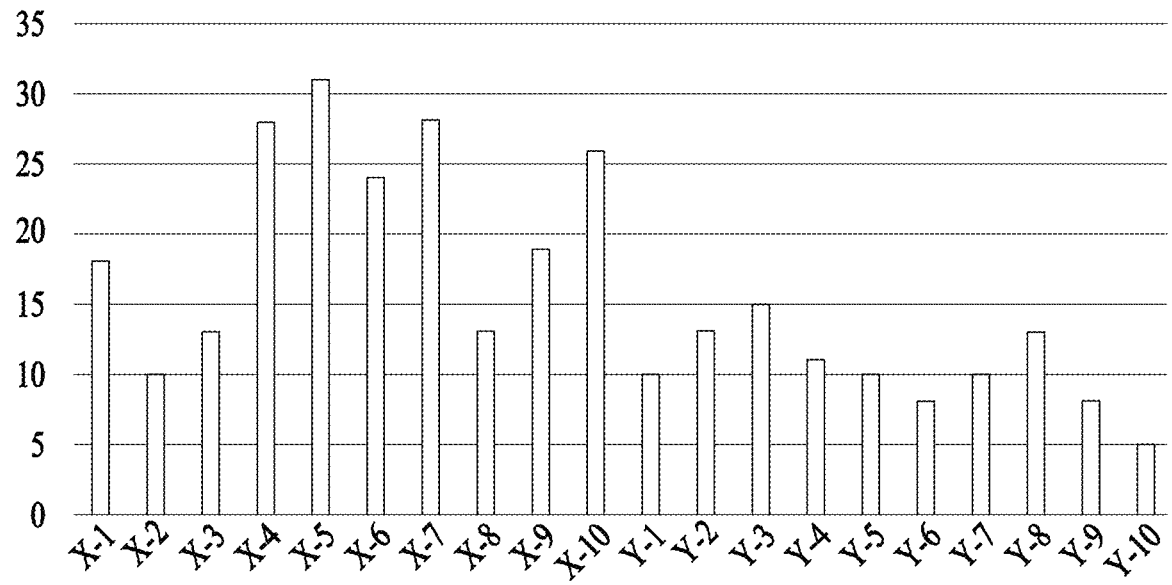
Figure 8:
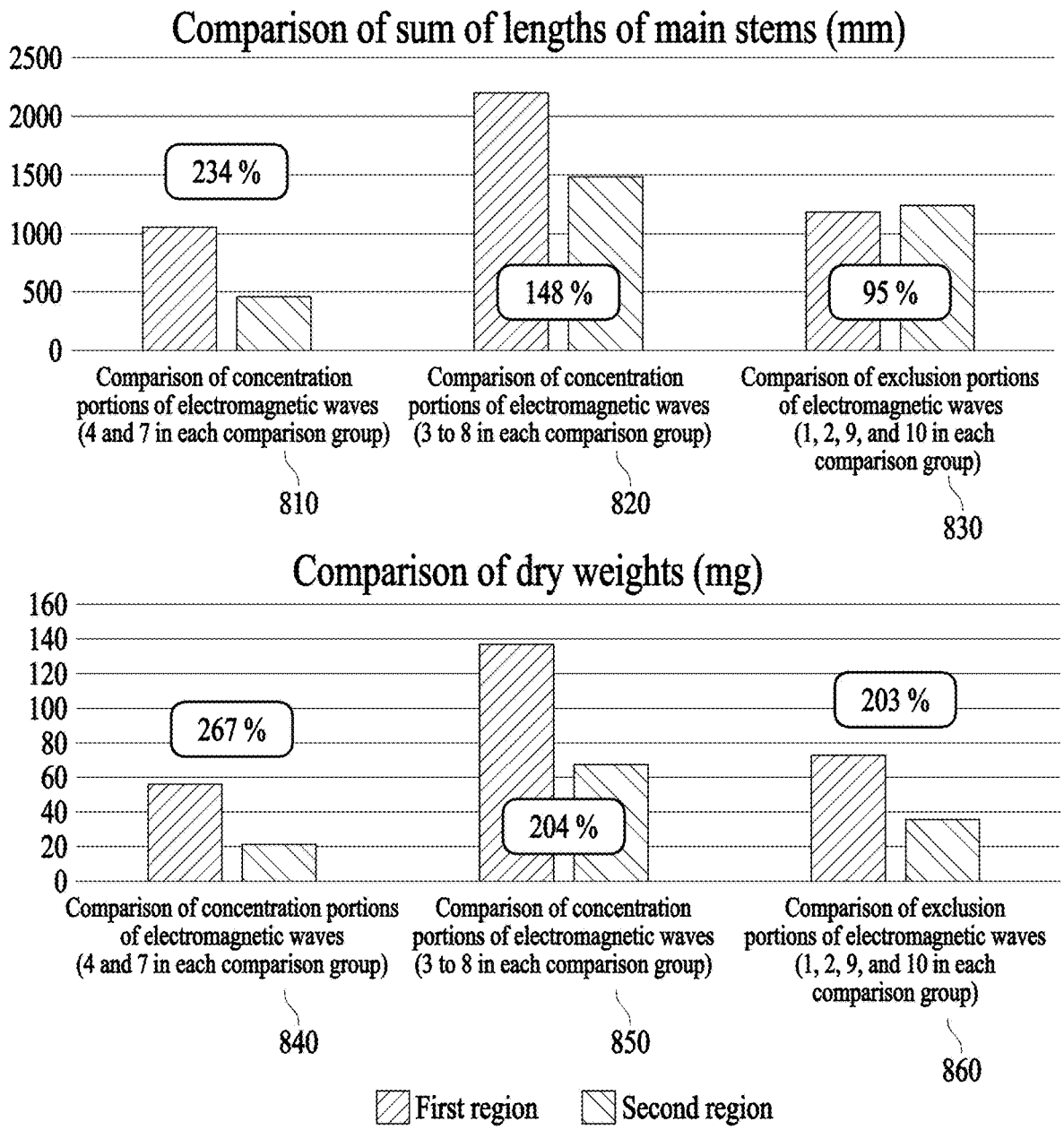
FIG. 8 shows graphs in which comparison between degrees of plant growth due to irradiation of electromagnetic waves is illustrated in an apparatus for irradiating a plant with electromagnetic waves according to an example embodiment.

However, the experimental environment described in FIGS. 6 to 8 is merely an environment designed for effectively comparing the effect of the electromagnetic waves irradiated from the first irradiator 120 on the plant growth with the effect of the electromagnetic waves irradiated from the second irradiator 140 on the plant growth. When the apparatus proposed in the present disclosure is used for plant cultivation, for effective plant growth, a region irradiated with the electromagnetic waves irradiated from the first irradiator 120 may overlap with at least a portion of a region irradiated with the electromagnetic waves irradiated from the second irradiator 140. For example, the electromagnetic waves irradiated from the first irradiator 120 and the electromagnetic waves irradiated from the second irradiator 140 uniformly irradiate to an entirety of the first region 310 and the second region 320, and thus the electromagnetic waves irradiated from the first irradiator 120 and the electromagnetic waves irradiated from the second irradiator 140 may uniformly reach the plurality of plants disposed on the mounting part 210.

FIG. 6 shows photographs in which a degree of plant growth due to irradiation of electromagnetic waves is photographed over time in the apparatus for irradiating a plant with electromagnetic waves according to an example embodiment.

Referring to FIG. 6, results 600 of photographing the degree of plant growth over time when a plant is irradiated with electromagnetic waves according to an example embodiment may be shown. The degree of plant growth shown in FIG. 6 was photographed according to a time elapsed after the experimental result, and in order to better observe the degree of plant growth, a degree of plant growth in the second half of the experiment (days 12 and 13) may also be photographed from the front.

In each photograph, based on the blocking part 220, a left side may correspond to the first region 310 and a right side may correspond to the second region 320.

FIG. 7 shows graphs in which a degree of plant growth due to irradiation of electromagnetic waves is illustrated in the apparatus for irradiating electromagnetic waves to a plant according to an example embodiment.

Referring to FIG. 7, results of measuring the degree of plant growth due to irradiation of electromagnetic waves to a plant according to an example embodiment may be shown below.

TABLE 1

|  | Number of germination | Number of leaves | Length of main stem (mm) | Gross weight (g) | Plate weight (g) | Dry weight (mg) |
| --- | --- | --- | --- | --- | --- | --- |
| X-1 | 6 | 19 | 70, 77, 73, 58, 78, 30 | 46.208 | 46.190 | 18 |
| X-2 | 4 | 13 | 76, 61, 50, 79 | 46.763 | 46.753 | 10 |
| X-3 | 4 | 13 | 46, 73, 75, 55 | 45.693 | 45.680 | 13 |
| X-4 | 7 | 21 | 48, 58, 82, 67, 82, 76, 84 | 47.699 | 47.671 | 28 |
| X-5 | 5 | 17 | 69, 54, 70, 97, 83 | 46.882 | 46.851 | 31 |
| X-6 | 5 | 17 | 90, 45, 89, 86, 44 | 47.146 | 47.122 | 24 |
| X-7 | 7 | 25 | 69, 85, 74, 79, 86, 85, 82 | 45.079 | 45.051 | 28 |
| X-8 | 2 | 7 | 86, 77 | 44.643 | 44.630 | 13 |
| X-9 | 5 | 17 | 51, 36, 83, 89, 65 | 43.104 | 43.085 | 19 |
| X-10 | 3 | 10 | 48, 75, 78 | 46.580 | 46.554 | 26 |
| Y-1 | 5 | 16 | 67, 81, 85, 49, 70 | 42.100 | 42.090 | 10 |
| Y-2 | 7 | 22 | 62, 84, 73, 68, 62, 60, 69 | 41.945 | 41.932 | 13 |
| Y-3 | 8 | 25 | 53, 82, 70, 60, 46, 60, 65, 68 | 45.179 | 45.164 | 15 |
| Y-4 | 4 | 13 | 78, 80, 68, 92 | 41.967 | 41.956 | 11 |
| Y-5 | 4 | 13 | 66, 57, 74, 76 | 44.475 | 44.465 | 10 |
| Y-6 | 4 | 13 | 68, 73, 83, 74 | 43.487 | 43.479 | 8 |
| Y-7 | 2 | 6 | 71, 63 | 43.326 | 43.316 | 10 |
| Y-8 | 6 | 18 | 59, 43, 67, 86, 46, 47 | 41.915 | 41.902 | 13 |
| Y-9 | 5 | 15 | 76, 63, 61, 57, 66 | 44.999 | 44.991 | 8 |
| Y-10 | 1 | 3 | 80 | 40.638 | 40.633 | 5 |

In the experimental results according to Table 1, the length of the main stem may be an indicator for indicating a length of each germinated stem.

Results showing the experimental results of Table 1 as a graph may correspond to reference numerals 710 and 720. Reference numeral 710 corresponds to the result of graphing the sum of the lengths of the main stem for each plant, and reference numeral 720 corresponds to the result of graphing the dry weight for each plant.

FIG. 8 shows graphs in which comparison between degrees of plant growth due to irradiation of electromagnetic waves is illustrated in an apparatus for irradiating a plant with electromagnetic waves according to an example embodiment.

Referring to FIG. 8, a degree of plant growth of a plant located in the first region 310 and a degree of plant growth of a plant located in the second region 320 according to an example embodiment may be compared. In relation to X-1 to X-10 and Y-1 to Y-10 (see FIG. 5 for detailed positions), at least some of X-3, X-4, X-5, X-6, X-7, and X-8, overlapping in the first sub-region 311, and at least some of Y-3, Y-4, Y-5, Y-6, Y-7, and Y-8 overlapping in the second sub-region 321 may correspond to concentration portions of the electromagnetic waves, and X-1, X-2, X-9, and X-10 not overlapping in the first sub-region 311 and Y-1, Y-2, Y-9, and Y-10 not overlapping in the second sub-region 321 may correspond to exclusion portions of the electromagnetic waves. X-N and Y-N may be expressed as "Nth for each comparison group" on the graph. In this case, a result related to X-N may be shown as the first region 310 and a result related to Y-N may be shown as the second region 320.

In graphs 810 to 860 which will described below, a value obtained by dividing a result value related to the first region 310 by a result value related to the second region 320 may be displayed.

With respect to X-3 to X-8 and Y-3 to Y-8 (the concentration portions of the electromagnetic waves), the graph 820 comparing the sums of the lengths of the main stems and the graph 850 comparing the dry weights may be shown. As a result, it may be confirmed that the sum of the total length of the main stems of X-3 to X-8 is 48% higher than the sum of total length of the main stems of Y-3 to Y-8, the sum of the dry weights of X-3 to X-8 is 104% higher than the sum of the dry weights of Y-3 to Y-8.

With respect to X-1, X-2, X-9, X-10, Y-1, Y-2, Y-9, and Y-10 (the exclusion portions of the electromagnetic waves), a graph 830 comparing the sums of the lengths of the main stems and a graph 860 comparing the dry weights may be shown. As a result, it may be confirmed that the sum of the total length of the main stems of X-1, X-2, X-9, and X-10 is 5% lower than the sum of total length of the main stems of Y-1, Y-2, Y-9, and Y-10, and the sum of the dry weights of X-1, X-2, X-9, and X-10 is 103% higher than the sum of the dry weights of Y-1, Y-2, Y-9, and Y-10.

In addition, additional analysis is performed on X-4 and X-7 in which many portions overlap in the first sub-region 311, and Y-4 and Y-7 in which many portions overlap in the second sub-region 321, and thus a graph 810 comparing the sums of the lengths of the main stems and a graph 840 comparing the dry weights may be shown. As a result, it may be confirmed that the sum of the total length of the main stems of X-4 and X-7 is 134% higher than the sum of the total length of the main stems of Y-4 and Y-7, and the sum of the dry weights of X-4 and X-7 is 167% higher than the sum of the dry weights of Y-4 and Y-7.

Consequently, with respect to the graphs 810, 820, 840, and 850 comparing the concentration portions of the electromagnetic waves, it may be confirmed that the degree of the plant growth of the plants located in the first region 310 is generally higher than that of the plants located in the second region 320. In consideration that the electromagnetic waves having the wavelength ranging 0.05 nm or more and 10 nm or less irradiated from the first irradiator 120 are irradiated merely to the first region 310, and the electromagnetic waves having the wavelength ranging 400 nm or more and 700 nm or less irradiated from the second irradiator 140 are merely irradiated to the second region 320, it may be confirmed that electromagnetic waves having the wavelength ranging 0.05 nm or more and 10 nm or less irradiated from the first irradiator 120 have a positive effect on the plant growth.

In addition to the above description, although not exhibited in the above experimental results, the electromagnetic waves having the wavelength ranging 0.05 nm or more and 10 nm or less may also have an effect of purifying air or a sterilizing effect on viruses and bacteria.

Figure 9:
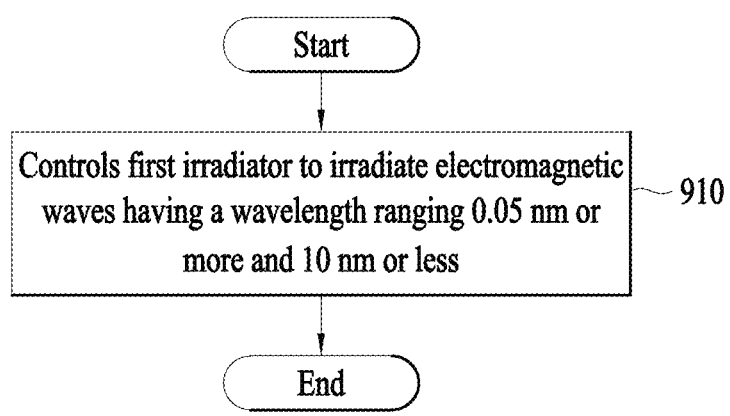
FIG. 9 is an operation flowchart illustrating a method of irradiating a plant with electromagnetic waves according to an example embodiment.

FIG. 9 is an operation flowchart illustrating a method of irradiating a plant with electromagnetic waves according to an example embodiment.

Referring to FIG. 9, the apparatus 100 for irradiating electromagnetic waves, which is described with reference to FIGS. 1 to 8, irradiates electromagnetic waves, which have a wavelength ranging 0.05 nm or more and 10 nm or less, to at least one plant. Specifically, the controller 130 included in the apparatus 100 for irradiating electromagnetic waves controls the first irradiator 120 to irradiate electromagnetic waves, which have a wavelength ranging 0.05 nm or more and 10 nm or less, to at least one plant (910). On the basis of a first condition related to the irradiation of the electromagnetic waves of the first irradiator 120, the controller 130 may determine whether the first irradiator 120 irradiates the electromagnetic waves. In addition, the controller 130 may determine at least one among an irradiation time, an irradiation area, an irradiation wavelength, and irradiation energy of the electromagnetic waves irradiated from the first irradiator 120 on the basis of the first condition. In addition to the above description, the controller 130 may determine various conditions related to the irradiation of the electromagnetic waves of the first irradiator 120 on the basis of the first condition.

In some example embodiments, the controller 130 may control the second irradiator 140 to irradiate electromagnetic waves having a wavelength ranging 400 nm or more and 700 nm or less. On the basis of a second condition related to the irradiation of the electromagnetic waves of the second irradiator 140, the controller 130 may determine whether the second irradiator 140 irradiates the electromagnetic waves. In addition, the controller 130 may determine at least one among an irradiation time, an irradiation area, an irradiation wavelength, and irradiation energy of the electromagnetic waves irradiated from the second irradiator 140 on the basis of the second condition. In addition to the above description, the controller 130 may determine various conditions related to the irradiation of the electromagnetic waves of the second irradiator 140 on the basis of the second condition.

The first condition and the second condition may be predetermined conditions or conditions determined by the controller 130. At least one of the first condition and the second condition may be determined in consideration of the plant growth cycle.

According to the present disclosure, an apparatus and a method for irradiating a plant with electromagnetic waves may promote plant growth by irradiating electromagnetic waves having a wavelength ranging 0.05 nm or more and 10 nm or less.

According to the present disclosure, it is possible to promote the growth of plants using a light source necessary for plant growth and soft x-rays together and to provide a method and an apparatus for easily growing plants even in an environment in which natural light is not present or is low. In addition, the above-described artificial light source promoting plant growth is provided so that it is possible to grow a great deal of plants even in a narrow area.

It is noted that effects of the present disclosure are not limited to the above-described effect, and other effects of the present disclosure will be apparent to those skilled in the art from the appended claims.

Meanwhile, in the present specification and the accompanying drawings, although the example embodiments of the present disclosure have been disclosed and specific terms have been used, these are merely used in a general sense to easily describe the technical content of the present disclosure and help understanding of the present disclosure, and it is not intended to limit the scope of the present disclosure. It is obvious to those skilled in the art to which the present disclosure pertains that other modifications may be implemented on the basis of the technical spirit of the present disclosure.

The electronic device or terminal according to the above-described example embodiments may include a processor, a memory for storing and executing program data, a permanent storage such as a disk drive, a communication port for communicating with an external device, and user interface devices such as touch panels, keys, and buttons. Methods implemented as software modules or algorithms may be computer-readable codes or program instructions executable on the processor and be stored on a computer-readable recording medium. Here, the computer-readable recording medium includes a magnetic storage medium (for example, a read-only memory (ROM), a random-access memory (RAM), a floppy disk, and a hard disk) and an optically readable medium (for example, a compact disc (CD)-ROM and a digital versatile disc (DVD)). The computer-readable recording medium may also be distributed in a computer system connected via a network so that a computer-readable program or code can be stored and executed in a distributed manner. The computer-readable recording medium may be readable by a computer, stored in a memory, and executed by a processor.

The example embodiments may be represented by functional block components and various processing operations. These functional blocks may be implemented in various numbers of hardware and/or software configurations which perform specific functions. For example, the example embodiments may employ integrated circuit components, such as a memory, processing, a logic, a look-up table, capable of executing various functions under the control of one or more microprocessors or other control devices. Similar that the components may be implemented as software programming or software components, the example embodiments may include various algorithms implemented in a combination of data structures, processes, routines, or other programming components and may be implemented in a programming or scripting language such as C, C++, Java, assembler, or Python. The functional aspects may be implemented with algorithms running on one or more processors. In addition, the example embodiments may employ the related art for an electronic environment setting, signal processing, and/or data processing. Terms such as "mechanism," "element," "part," and "component" may be used broadly and are not limited to mechanical and physical components. These terms may include the meaning of a series of routines of software in association with a processor or the like.

The above-described example embodiments are merely examples, and other example embodiments may be implemented within the scope of the appended claims which will be described below.

What is claimed is:

1. An apparatus for irradiating a plant with electromagnetic waves, the apparatus comprising:
a power supply;
a first irradiator configured to receive electric power from the power supply and irradiate electromagnetic waves;
a second irradiator configured to receive electric power from the power supply and irradiate electromagnetic waves; and
a controller configured to control the first irradiator to irradiate first-type electromagnetic waves and to control the second irradiator to irradiate second-type electromagnetic waves,
wherein the first-type electromagnetic waves include one or more electromagnetic waves having a wavelength ranging from 0.05 nm to 10 nm, and the second-type electromagnetic waves include one or more electromagnetic waves having a wavelength ranging from 400 nm to 700 nm.

2. The apparatus of claim 1, wherein the controller controls the power supply to control a voltage or a tube voltage and a current or a tube current which are supplied to the first irradiator.

3. The apparatus of claim 1, further comprising:
a mounting part which is disposed to face the first irradiator and on which plants are placed.

4. The apparatus of claim 3, wherein the controller controls the first irradiator to irradiate the electromagnetic wave at a first intensity to a first region of a space defined by the mounting part and controls the first irradiator to irradiate the electromagnetic wave at a second intensity to a second region of the space defined by the mounting part.

5. The apparatus of claim 3, further comprising:
one or more ventilation devices configured to circulate air in the space defined by the mounting part.

6. The apparatus of claim 3, wherein the first irradiator is installed on at least one of an upper side and a side surface of the mounting part.

7. The apparatus of claim 1, wherein the first irradiator includes a filter configured to block a wavelength component ranging 0.05 nm or less with respect to the electromagnetic waves to be irradiated.

8. The apparatus of claim 1, wherein the controller controls the first irradiator and the second irradiator such that at least a portion of a time period in which the first irradiator irradiates the electromagnetic waves overlaps a time period in which the second irradiator irradiates the electromagnetic waves.

9. The apparatus of claim 1, wherein at least a portion of a region in which the first irradiator irradiates the electromagnetic waves overlaps a region in which the second irradiator irradiates the electromagnetic waves.

10. The apparatus of claim 1, wherein the first irradiator corresponds to a tube including an anode and a cathode, the anode is connected to one side of the power supply, and the cathode is connected to the other end of the power supply.

11. An apparatus for irradiating a plant with electromagnetic waves, the apparatus comprising:
a power supply;
a first irradiator configured to receive electric power from the power supply and irradiate electromagnetic waves; and
a controller configured to control the first irradiator to irradiate electromagnetic waves, wherein the electromagnetic waves include at least one electromagnetic wave having a wavelength ranging from 0.05 nm to 10 nm,
wherein the first irradiator corresponds to a tube including an anode, a cathode, and at least one gate, the anode is connected to one side of the power supply, the cathode is connected to the other end of the power supply, and at least one of one side or other side of the controller is connected to the at least one gate.

12. The apparatus of claim 11, wherein the cathode includes a carbon nanotube (CNT).

13. The apparatus of claim 12, wherein the cathode is formed of a CNT structure including a plurality of unit yarns, each having a structure in which the CNTs are aggregated to extend in a first direction.

14. The apparatus of claim 13, wherein, in the CNT structure, a front end of each of the unit yarns is directed in a direction that is the same as the first direction.

15. A method of operating an apparatus to irradiate a plant with electromagnetic waves, the apparatus comprising:
a power supply;
a first irradiator configured to receive electric power from the power supply and irradiate electromagnetic waves;
a second irradiator configured to receive electric power from the power supply and irradiate electromagnetic waves; and
a controller configured to control the first irradiator to irradiate first-type electromagnetic waves and to control the second irradiator to irradiate second-type electromagnetic waves,
wherein the first-type electromagnetic waves include one or more electromagnetic waves having a wavelength ranging from 0.05 nm to 10 nm, and the second-type electromagnetic waves include one or more electromagnetic waves having a wavelength ranging from 400 nm to 700 nm,
the method comprising:
irradiating the first-type electromagnetic waves and the second-type electromagnetic waves to at least one plant.

* * * * *